Figures 1, 2:
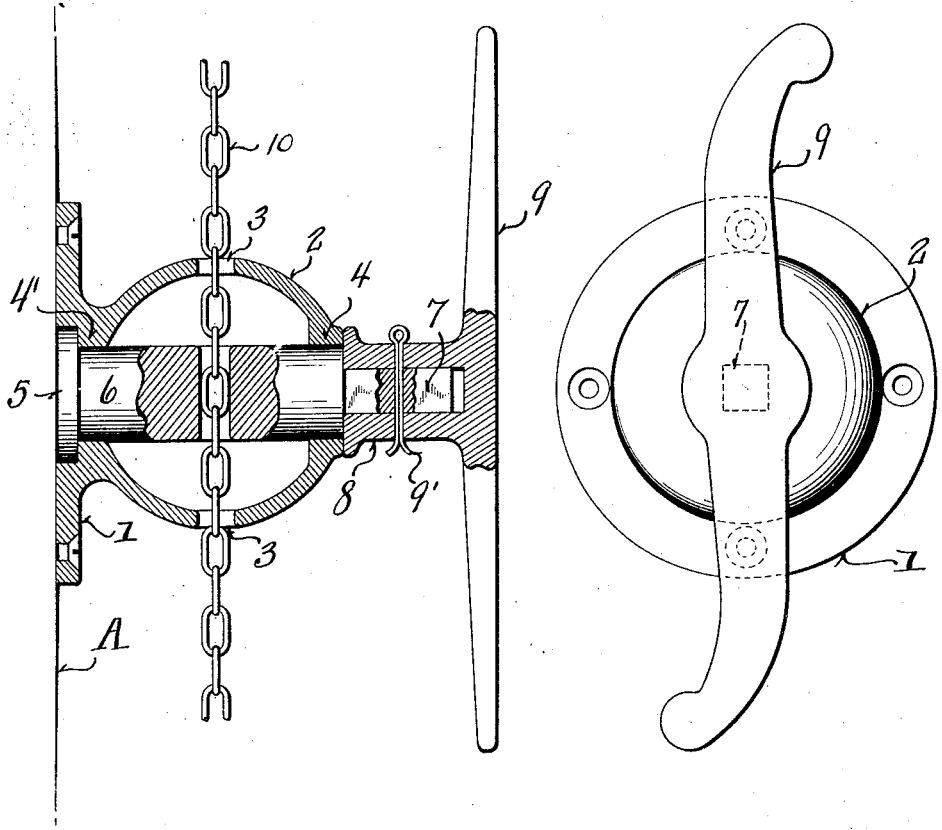

Dec. 17, 1929. E. LAZAR 1,740,182
BOLT CONTROLLING FIXTURE
Filed March 11, 1929

Inventor:
Emil Lazar

Patented Dec. 17, 1929

1,740,182

UNITED STATES PATENT OFFICE

EMIL LAZAR, OF MILWAUKEE, WISCONSIN

BOLT-CONTROLLING FIXTURE

Application filed March 11, 1929. Serial No. 346,135.

This invention refers to bolt controlling fixtures, and it is directed to that well known type of door having upper and lower bolts which are adapted to be simultaneously retracted.

The invention is specifically directed to provide a simple, economical and effective bolt controlling fixture wherein the entire assemblage comprises only three parts, which is so arranged that the moving parts are well protected.

With the above object in view, the invention consists in certain peculiarities of construction and combination of parts which are hereinafter described and subsequently claimed.

In the drawing, Figure 1 represents a sectional elevation of a bolt controlling fixture embodying my invention, and Figure 2 is a face view of the same.

Referring by character to the drawing 1 indicates the flange base of a dome-like housing 2, which housing is provided with upper and lower aligned runner apertures 3. The outer and inner ends of the dome-like housing are provided with journalled bearings 4 and 4', respectively. The inner journalled bearing 4' is shouldered for nested engagement with the head 5 of a rotatory stud 6, which stud extends outwardly through the journalled bearing 4 and is provided with a reduced rectangular shank 7 for interlocking engagement with the hub 8 of a bolt controlling lever 9.

The hub 8 and shank 7 of the stud are secured by a split key 9'. The bolt is also provided with a central aperture through which a chain or runner 10 is passed, and the opposite ends of the runner are extended through the apertures 3—3, it being understood that these runners are connected at their outer ends with bolts forming no part of my invention.

It will also be noted that owing to the nested engagement of the head 5 of the bolt, and its shouldered journal 4, that when the fixture is secured to the face of a door A, the stud is thus held from longitudinal movement.

From the foregoing description, it will be seen that the chain or runner, which extends through the stud aperture and also the housing aperture, will thus be wound upon the stud incidental to rotation of the lever in either direction whereby the bolts will be retracted.

I claim:

A bolt controlling fixture for doors comprising a housing having a retaining flange and a spherical dome extending therefrom, the same being provided with aligned runner apertures and front and rear bearing apertures, the rear bearing apertures being exteriorly shouldered, a head stud shouldered in the bearing apertures, a shank extending from the stud exteriorly of the dome portion thereof, a bolt controlling lever in engagement with the rectangular shank, and bolt controlling runners connected to the stud.

In testimony that I claim the foregoing I have hereunto set my hand at Milwaukee, in the county of Milwaukee and State of Wisconsin.

EMIL LAZAR.